United States Patent
Gephart et al.

(10) Patent No.: US 8,738,921 B2
(45) Date of Patent: May 27, 2014

(54) SYSTEM AND METHOD FOR AUTHENTICATING A PERSON'S IDENTITY USING A TRUSTED ENTITY

(75) Inventors: Brian R. Gephart, Bluffdale, UT (US); Michael F. Dobson, Riverton, UT (US); Bradley W. Mitchell, Cottage Grove, MN (US); Reed H. Larsen, West Jordan, UT (US)

(73) Assignee: Transactionsecure LLC, Salt Lake City, UT (US)

( * ) Notice: Subject to any disclaimer, the term of this patent is extended or adjusted under 35 U.S.C. 154(b) by 1266 days.

(21) Appl. No.: 11/944,358

(22) Filed: Nov. 21, 2007

(65) Prior Publication Data

US 2008/0184351 A1      Jul. 31, 2008

Related U.S. Application Data

(63) Continuation-in-part of application No. 11/749,403, filed on May 16, 2007, now abandoned.

(60) Provisional application No. 60/747,381, filed on May 16, 2006.

(51) Int. Cl.
| | |
|---|---|
| *H04L 29/06* | (2006.01) |
| *H04L 9/32* | (2006.01) |
| *G06F 21/00* | (2013.01) |
| *G06F 7/04* | (2006.01) |
| *G06F 12/14* | (2006.01) |
| *G06F 21/31* | (2013.01) |

(52) U.S. Cl.
CPC .............. *H04L 63/123* (2013.01); *H04L 63/08* (2013.01); *H04L 9/3226* (2013.01); *G06F 21/31* (2013.01); *H04L 63/1416* (2013.01)
USPC ........... 713/182; 713/161; 713/168; 713/170; 713/179; 726/5; 726/7; 726/22

(58) Field of Classification Search
CPC ..... H04L 63/123; H04L 63/08; H04L 9/3226; H04L 63/1416; G06F 21/31
USPC ............ 726/7, 5, 22; 713/161, 168, 170, 179, 713/182
See application file for complete search history.

(56) References Cited

U.S. PATENT DOCUMENTS

| | | | |
|---|---|---|---|
| 5,224,173 A | 6/1993 | Kuhns et al. | |
| 5,754,675 A | 5/1998 | Valadier | |

(Continued)

FOREIGN PATENT DOCUMENTS

| | | |
|---|---|---|
| WO | WO2005062574 | 7/2005 |
| WO | WO2006062998 | 6/2006 |
| WO | WO2006096862 | 9/2006 |

OTHER PUBLICATIONS

Intelligent manufacturing systems, A Configurable Virtual Reality System for Multi-Purpose Industrial Manufacturing Applications, Information Security Technologies Report.

(Continued)

*Primary Examiner* — Aravind Moorthy
(74) *Attorney, Agent, or Firm* — Maschoff Brennan (57) ABSTRACT

A system and method are provided for authenticating a person's identity to a business using a trusted entity with a secure repository to store and protect the person's identity information. The person accesses their account on the trusted entity's server using a user name and a password. Then, the trusted entity grants the person a unique code so the person can authenticate their identity to the business. The person delivers the unique code to the transactional entity. The business makes a request to verify the unique code with the trusted entity. The trusted entity verifies the unique code, which authenticates the person's identity to the business.

24 Claims, 6 Drawing Sheets

(56) References Cited

U.S. PATENT DOCUMENTS

| | | | |
|---|---|---|---|
| 6,095,413 | A | 8/2000 | Tetro et al. |
| 6,202,151 | B1 | 3/2001 | Musgrave et al. |
| 7,209,886 | B2 | 4/2007 | Kimmel |
| 7,240,363 | B1 | 7/2007 | Ellingson |
| 7,272,110 | B2 | 9/2007 | Lee et al. |
| 7,527,192 | B1 | 5/2009 | Chaskin et al. |
| 2002/0042879 | A1 | 4/2002 | Gould et al. |
| 2002/0049912 | A1* | 4/2002 | Honjo et al. ............... 713/201 |
| 2003/0070101 | A1 | 4/2003 | Buscemi |
| 2004/0019787 | A1* | 1/2004 | Shibata ..................... 713/168 |
| 2005/0273842 | A1 | 12/2005 | Wright et al. |
| 2005/0289645 | A1 | 12/2005 | Hori |
| 2006/0089905 | A1 | 4/2006 | Song et al. |
| 2006/0136737 | A1* | 6/2006 | Bauchot et al. ............ 713/183 |
| 2007/0110282 | A1 | 5/2007 | Millsapp |
| 2007/0220614 | A1 | 9/2007 | Ellis et al. |

OTHER PUBLICATIONS

Federal Identity Credentialing Committee, Federal Identity Management Handbook, Sep. 2005.
Liberty Specifications Tutorial, www.projectliberty.org.
CAC/PKI Training Guide, Common Access Card/Public Key Infrastructure, http://setdweb.belvoir.army.mil.
The Hunt for Solutions, FAST Phase 1 White Paper, Oct. 14, 2000.
Information Security Technologies Report, Virtual Real World, Security Services, IRMA/WP1Task 4-6, pp. 13/204 to 45/204.
http;//www.ftc.gov/opa/2003/09/idtheft.htm; 3 pages.
http://www.orbiscom.com/press/industry/wsj.html: Orbiscom Tackles Concerns About eCommomerce Security; Jan. 18, 2001; Source: The Wall Street Jornal; 2 Pages.
U.S. Appl. 11/749,403, filed May 16, 2007; Brian R. Gephart; office action issued Jan. 19, 2011.

* cited by examiner

SYSTEM AND METHOD FOR AUTHENTICATING A PERSON'S IDENTITY USING A TRUSTED ENTITY

PRIORITY CLAIM

This application is a continuation-in-part of U.S. patent application Ser. No. 11/749,403, filed on May 16, 2007, now abandoned which claims priority to and the benefit of U.S. Provisional Patent Application Ser. No. 60/747,381, filed May 16, 2006, each of which is incorporated by reference in its entirety.

FIELD OF THE INVENTION

The present invention relates generally to protecting sensitive information from identity theft.

BACKGROUND

With advances in technology and the expansion of the Internet, people and companies are transacting more of their business electronically via the Internet. Many relationships between businesses and their customers are formed and maintained via electronic communication or through the telephone without the business' representatives having any physical interaction with their customers. Usually an exchange of products and services for money results from these relationships.

Some of these relationships between companies and customers involve companies setting up accounts (e.g. extending loans and credit) to customers. In order to form this relationship, a person provides the company with some important information, like their name, address, phone number, employer, Social Security Number (SSN), and birthday. With the name, SSN, and birthday, the business can check the person's credit score or credit worthiness with a credit agency and potentially extend the person the loan or credit. Anyone who possesses these limited pieces of information of a person's name, SSN, and birthday may have the ability to pose as the person and get a loan, credit, products, and services from businesses.

Since the loan, credit, or account is tied to the person's identity, name and SSN, and not the impersonator, the impersonator or identity thief can steal money, products, and services from the businesses leaving either the person or business to pay for the loss. Usually the person whose identity was used does not know about the use of their identity until weeks or months after their identity was used and an account previously unknown to them shows up on their credit report. As a result of the previously unknown account, the person may receive a poor crediting rating or a collection agency can attempt to recover payment from the person for the business. Once a person discovers this identity theft, they can go through a laborious process of proving they did not apply for the loan, credit, or account and showing that their identity was stolen. After this occurs, the business is left to find the impersonator or absorb the loss. Finding impersonators or an identity thief is difficult because most if not all of the identity information known about the thief is actually the identity information of the person whose identity was stolen. Identity theft has cost businesses and individuals billions of dollars and millions of hours of time to identify the fraud and clean up the individual's credit.

The identity theft problem exists largely because a person's name, SSN, and birthday are frequently used and given to others to verify the person's identity. The second problem is a person's name, SSN, and birthday are permanently associated with the individual. Individuals use this information to get employment, apply for a credit card, obtain a mortgage, buy a mobile phone, get healthcare, and perform numerous other transactions. A person's SSN and birthday are usually stored by businesses electronically in databases or on physical paper documents which can be viewed by many individuals within a business. Once a person supplies a SSN and birthday they lose control of how that information will be used and who will view that information. Sometimes business computer systems and databases get hacked into allowing the hacker access to the person's personal identity information. Sometimes the SSN and birthday are transmitted to businesses and others electronically via the Internet. The Internet is an unsecured network, so information not properly encrypted can be viewed by others on the Internet. There are various ways an impersonator or identity thief can obtain a person's SSN or birthday. The thief can obtain this information by looking at business records, viewing unencrypted messages with this information, or other types of fraud.

Once a thief has someone's SSN and birthday, the thief can use that information anytime during the lifetime of the person because of the permanence of SSN and birthday and its association with the person. The SSN and birthday have been reliable indicators of a person's existence but their widespread use by both the person and identity theft impersonators has made them of little use in authenticating the identity of person using the information.

SUMMARY

A system and method are provided for authenticating a person's identity to a business using a trusted entity with a secure repository to store and protect the person's identity information. The person accesses their account on the trusted entity's server using a user name and a password. Then, the trusted entity grants the person a unique code so the person can authenticate their identity to the business. The person delivers the unique code to the transactional entity. The business makes a request to verify the unique code with the trusted entity. The trusted entity verifies the unique code, which authenticates the person's identity to the business.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
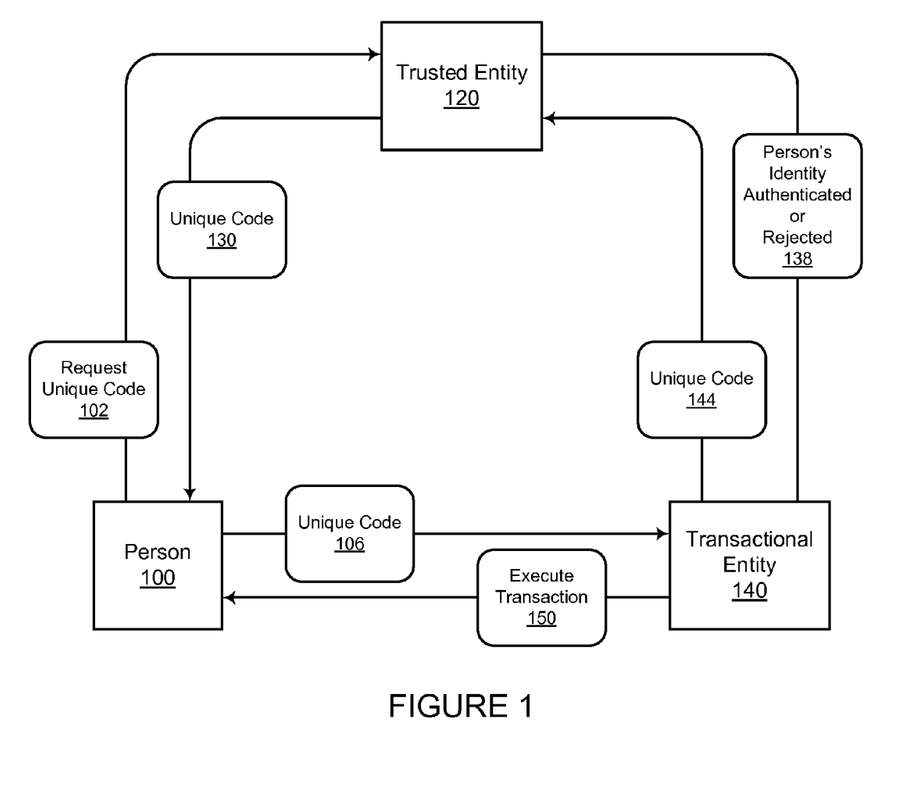
FIG. 1 is an illustration of an embodiment of a method for a person using a unique code from a trusted entity to authenticate the person's identity with a transactional entity.

One embodiment for protecting an individual's identity from identity theft is shown in FIG. 1. A person 100 can engage in a transaction or relationship with a transactional entity 140. The transactional entity can request that the person prove or authenticate their identity. The person can request a unique code 102 from a trusted entity 120 or more specifically a trusted entity's computer system. The trusted entity can be an entity trusted by both the person and transactional entity. The trusted entity may have previously authenticated the person's identity and stored the person's information in the trusted entity's system.

In order to validate identity, the trusted entity can ask the person questions about their identity and compare the person's responses with the information stored about the person in the trusted entity's computer system. The questions can be a user name, password, Social Security Number (SSN), birthday, or mother's maiden name. If the person answers the questions correctly, the trusted entity can provide the person with a unique code 130. The unique code can be stored in the trusted entity's system and can be linked to the person's stored information.

The person can then deliver the unique code 106 to the transactional entity. The transactional entity can verify the unique code 144 by communicating with the trusted entity. If the unique code is valid and is linked to the person's stored information, the transactional entity can validate or authenticate the unique code, and this means the person's identity is also authenticated 138. If the unique code is not valid or is not linked to the person's stored information, the trusted entity can reject or invalidate the unique code meaning the person's identity is not authenticated. When the trusted entity authenticates the person's identity, then the transactional entity can proceed and execute the transaction 150, which uses the person's authentic identity.

An advantage of this embodiment is that the person can avoid divulging their personal information to a transactional entity in order for the person to transact business with the transactional entity. Another result is that the transactional entity can have a greater confidence level than using traditional verification methods that the person they are transacting with is the true owner of the identity and information used in the transaction.

For example, the person may want a new credit card. Initially, the person contacts the credit card company (the transactional entity) about getting a new credit card. The credit card company may request that the person provide proof of their identity. Then the person requests a unique code from the Social Security Administration (SSA—the trusted entity) using a user name and password. Both the person and transactional entity trust the SSA. The SSA may ask additional questions before granting an alpha-numeric string (the unique code) to the person. Next, the person delivers the unique code to the credit card company. The credit card company makes a request to verify the unique code with the SSA. The SSA authenticates the identity or indicates the person does not match the identity information given to the credit card company. If the unique code and identity information is authenticated, then the credit card company issues a new credit card to the person (executes the transaction). The unique code links the identity information with the person using that information, meaning the person using the identity information is the true owner of that information.

Figure 2:
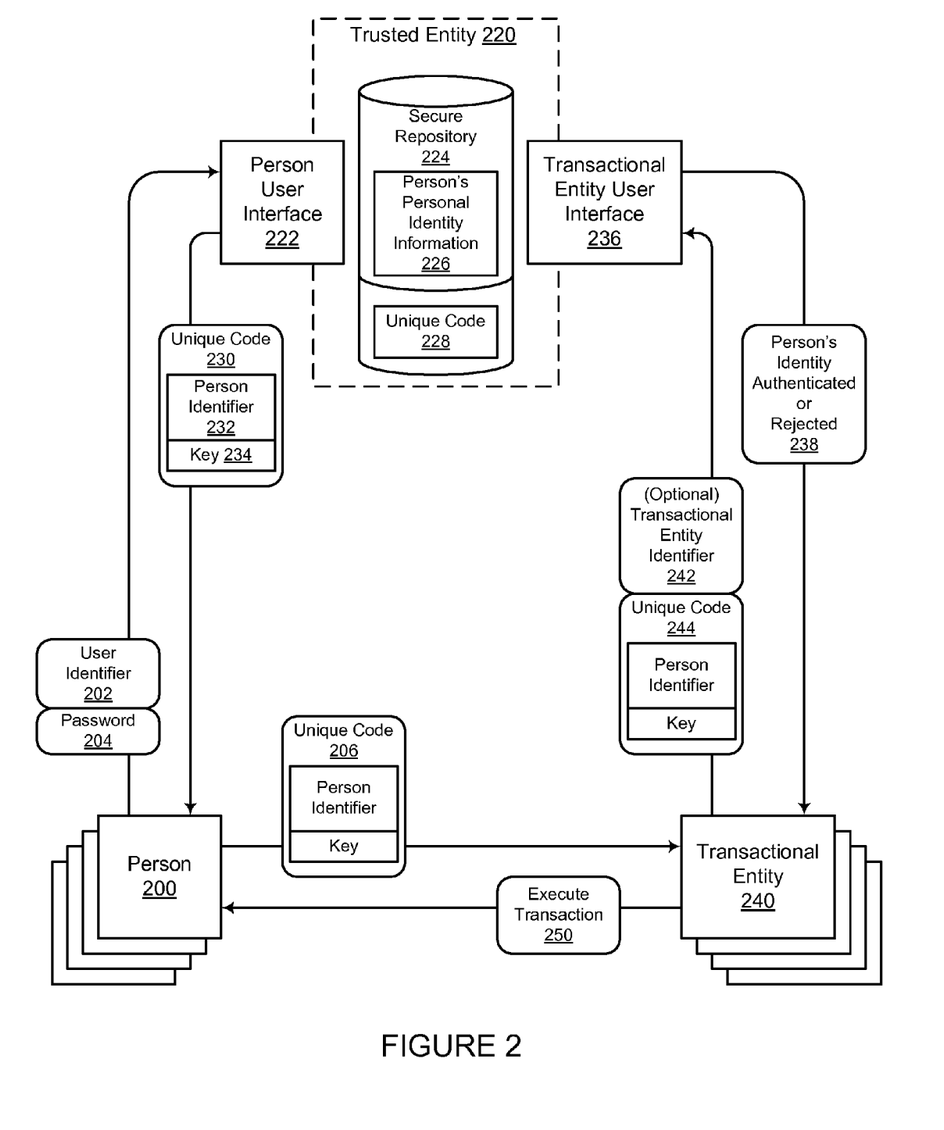
FIG. 2 is an illustration of an embodiment of a method a person uses to obtain a key from a trusted entity and a transactional entity's authentication of the key with the trusted entity.

Another more detailed embodiment for protecting an individual's identity from identity theft is shown in FIG. 2. A person 200 using a user identifier 202 and password 204 provides a trusted entity 220 with the person's personal identity information 226. Either the trusted entity or the person can determine the user identifier or password. The user identifier or password can be established at anytime during the process of initially authenticating the person's personal identity information. The trusted entity can include the Social Security Administration (SSA), an insurance company, or another institution that maintains secure information. The person's personal identity information can be stored in a secure repository 224.

In an embodiment, the person's personal identity information 226 can be stored with an authentication flag in the secure repository immediately after the information is provided by the person. The authentication flag can apply to each piece of information, all the information combined, or both. Once a piece of information (or all the information combined) is authenticated the flag is set to authentic. Only authentic information would be used to verify identity with transaction entities.

In another embodiment, a person's unverified personal identity information 226 is stored in a separate temporary secure repository until the information is authenticated. Once the information is authenticated the information is transferred to the person's personal identity information on a permanent secure repository.

The secure repository 224 can be a secure database, server, or other combination of electronic storage and retrieval system. Personal information, like a blood or DNA sample, that may not be housed by electronic means may be stored through a physical facility. Secure is generally defined as sufficient security measures have been employed to protect against unauthorized physical, software, firmware, electronic, and human intrusions. Information can be secured during network transfer using Secure Socket Layer (SSL) and other technologies used to protect networks, databases, and servers against unauthorized eavesdropping. Networks, databases, and servers can also be secured using encryption. Secure can also mean protecting information against natural and man-made disasters that would otherwise electronically or physically destroy the information stored in the repository.

In another embodiment, the database or server can be secured by partitioning the database, partitioning the server, or physically separating servers. Each piece of a person's personal identity information 226 can be placed on a different partition or server so that no one partition or server has the person's personal identity information linked together. For example, a person's name can be on one server, SSN on another, birthday on another, and the link pointing to name, SSN, and birthday on still another server. Identity information can have more value when the information is combined with other information on the same identity. If a hacker or identity thief is able to copy or hack into particular server they may only obtain birthdays for example. A birthday may not have much value for an identity thief, if the thief does not know the name or SSN associated with the birthday.

The person's personal identity information 226 can include a person's name, social security number, birthday, current and prior addresses, employment history and information, financial and credit information, biographical information, biometric data, personal information only known by the person, codes from physical devices or hardware in the person's possession, or combinations thereof. Biometric data can comprise a photograph, handwriting, signature, fingerprints, voiceprints, retinal scans, iris scans, DNA or blood sample, facial recognition, hand geometry, vascular patterns, dental records, or combination thereof. Historically biometric data (e.g. fingerprints) is a reliable indicator of a person's identity because biometric data is unique and difficult for another person to replicate or fabricate.

The person's personal identity information 226 can be independently verified by the trusted entity 220 using authentic documents and governmental and non-governmental organizations that can definitively verify a person's identity. The SSA can be used to verify a Social Security Number (SSN). The FBI can be used to verify fingerprints. The trusted entity may be able to interface with older or legacy computer systems to automate the verification or authentication process of the person's original personal identity information. Legacy computer systems can comprise the SSA's system, FBI's system, credit reporting agencies (TransUnion, Equifax, or Experian), or credit card companies' systems.

The trusted entity 220 can have various levels of established criteria to independently verify a person's identity depending on the confidence level or level of veracity desired by the transactional entity or trusted entity's use of the person identity. Biometric data can provide stronger evidence of a person's identity than a SSN, but obtaining and storing biometric data can also be more expensive than obtaining and storing a SSN. The established criteria to independently verify a person's identity can be analogized to the background checks used for different grades of government security clearances. Since the transactional entities usually bear most of the cost of the loss in identity theft, they may also pay the trusted entity to independently verify a person's identity. The transactional entity can determine the level of independent verification desired based on information traditionally collected and the cost of achieving a certain confidence level for the person's identity.

The trusted entity 220 can continue to add to, authenticate, collect, or audit the person's personal identity information after the information has been initially authenticated. For example, fingerprints may be added after some basic information, like SSN and birthday, has been authenticated. Current balances on a checking or credit card account that has previously been verified can be collected. Asking the person questions about current balances can be another method to thwart identity theft because an impersonator may not know the person's current account information. Auditing information already authenticated can ensure information or data stays secure and accurate.

Either the person 200 or the transactional entity 240 can initiate a transaction between the two parties. Then the person can access the person's individual account on the trusted entity's system using a user identifier 202 and password 204, which will be discussed later. The transactional entity 240 can comprise, but is not limited to, a bank, credit card company, mortgage company, financial institution, business, insurance company, healthcare provider, government entity, service provider, or other entity desiring the person's identity to be authentic. At some point in the transactional relationship, the transactional entity can request proof of the person's identity. Usually the transactional entity requests that the person prove their identity on the parties' initial interchange or transaction.

The difficulty most transactional entities encounter is definitively authenticating a person's identity for the first time. In the past, companies assumed knowledge of a SSN, birthday, and other basic personal information was sufficient to prove a person's identity. But now, knowledge of a SSN, birthday, and other basic personal information is not sufficient to prove identity because of several factors including: 1) The frequent use of the SSN, birthday, and other basic personal information; 2) the ease by which an impersonator or identity thief can obtain a SSN and birthday through electronic submission and records; 3) the ease by which an impersonator or identity thief can establish an relationship with a new transactional entity (unknown to the person) without face-to-face contact; 4) the impersonator or identity thief can also more easily escape liability versus other types of theft because very little authentic evidence of the impersonator's identity is available.

Some advantages of using a third party trusted entity 220 is that the trusted entity has already independently authenticated a person's identity which can be expensive. In addition, the cost for the trusted entity to provide evidence to the transactional entity 240 that the person's identity is genuine (after the identity has been authenticated) can be significantly less than the cost for the transactional entity to independently verify the person's identity. By using the trusted entity, the transactional entity 240 does not have to go through the initial laborious process of authenticating the person's identity and the transactional entity can use the information already collected by the trusted entity. The reason many transactional entities, which are victims of identity theft, do not put more time, effort, and money into authenticating a person's identity is because it increases the transaction cost, and higher costs make them less competitive in the market. Transactional entities attempt to balance the risk of identity theft with providing competitive goods and services.

Another result of using a common trusted entity 220 is that many transactional entities 240 can use the same authenticated personal identity information 226 on the same person 200. The one time cost to authenticate the person's identity can be spread over many transactional entities, which can lower the cost of authenticating the person's identity for each of the transactional entities.

A further advantage to using a trusted entity 220 is that the person 200 may only have to provide evidence and prove their identity once versus the current procedure requiring the person to provide evidence and prove their identity with each transactional entity 240. For the person to provide proof of their identity only once can save the person time and money.

The person 200 can access the person's individual account on trusted entity's system using a user identifier 202 and password 204 after the transactional entity 240 has requested that the person authenticate their identity. The user identifier can include a person's name, SSN, unique user name, or second password. The password can have a single password, multiple passwords, alphanumeric string, biometric data, any of the person's personal identity information 228 stored in the secure repository 224, or combination thereof. The trusted entity's system can use a secure repository, database, server, website, computer network, telephone network, human operators, or combination thereof. The computer network can use 128-bit encryption to protect the information on unsecured networks, like the Internet.

In one embodiment the person 200 accesses the trusted entity's system using a person user interface 222. The person user interface can comprise a web page, computer terminal, computer display, automated telephone system, telephone operator, or representative employed by the trusted entity 220. In order for the person to access their account on the trusted entities server, the person's user identifier 202 and password 204 must match the user identifier and password stored in the secure repository associated with the person.

In one embodiment the trusted entity's system can limit the number of unsuccessful attempts to access the system by a particular computer, by a particular person, or using a particular user identifier, in order to further protect the secure repository from unauthorized access or intrusions.

The trusted entity 220 can grant a key 234, after the person's user identifier 202 and password 204 matches the user identifier and password stored in the secure repository associated with that person. The key can be associated with a person identifier 232 which together can form a unique code 230 that a transactional entity 240 can use to verify the person's identity. The trusted entity can link the key to the person identifier and store the link and key in the secure repository. Storing the link and key can be performed immediately before or after the trusted entity delivers or displays the key to the person.

The key can be used by the transactional entity to authenticate the person's identity without the person divulging or providing the transactional entity with their personal identity information. The transactional entity can verify the person's identity and the person can maintain their personal identity information confidential (e.g. SSN and birthday). Unlike the SSN and birthday which are permanent, the key is temporary and can be changed or invalidated if the person suspects the key has been stolen or misused. In an embodiment, the key may also be changed at a predetermined interval of time. In this embodiment the key can be analogized to a credit card that has an account number and expiration date. When a credit card is stolen, the person can cancel the account number printed on the card and the credit card company issues the person a new card. After the expiration date of the credit card, the person also has to get a new card. The temporary nature of this key can provide some protection against identity theft.

The key 234 can be a single-use key, limited use key, time limited key, unique key, alpha-numeric string, character string, or combination thereof. A single-use key can expire so that the key no longer confirms a person's identity after the transaction entity enters the unique code on the trusted entity's system. A limited use key (single or multiple use, but not unlimited use) can operate in a similar manner to single-use key, but may only allow a predetermined number of accesses before the key expires. A time limited key can expire after a predetermined time. For example, the time limited key may expire after 2 weeks regardless of whether it was used by the transaction entity. The single-use key, limited use key, and time limited key can provide additional protection against identity theft, because if the key (along with the person identifier 232) is stolen or misused, the key can only be used for a single access, for a predetermined number of accesses, or for a limited time period, respectively. This way the identity thief still does not have any permanent personal identity information about the person that can be used later. The unique key can be unique without the person identifier, so the key, person identifier, or unique code can be unique.

The person identifier 232 can be created initially when the person's personal identity information 226 is first entered into the secure repository 224 or when the person accesses their account with the trusted entity 220 to get the key 234. The person identifier can be the same for all transactional entities, different for each type of transactional entity, or different for each transactional entity. The person identifier can include the person's name, social security number, or unique identifying name. The person identifier can be different than the user identifier 202 used by the person to access the person's account on the trusted entity's system. Using a person identifier 324 that is different from the user identifier 202 may provide the additional benefit of additional security to the person's account, because an impersonator or identity thief may still need to discover both the user identifier and password 204 not just the password if the unique code 230 was misplaced, misused, or stolen. The key, person identifier, or unique code can be displayed on a computer terminal, web page, or printed on a certificate to be given to the transaction entity.

The person 200 can deliver the unique code 206 to the transactional entity 240 after the person receives the unique code 230 from the trusted entity. The unique code 230, 206, or 244 can be delivered using a computer network, telephone network, mail, email, electronic delivery systems, mechanical delivery systems, physical delivery systems, or human delivery systems. Any of these delivery systems can be secured. The computer and electronic deliver systems can be secured using encryption.

The transactional entity 240 can verify the unique code 244 by communicating with the trusted entity's system after the transactional entity receives the unique code 206 from the person 200. In one embodiment, the transactional entity 240 accesses the trusted entity's system using a transactional entity user interface 236. The transactional entity user interface can be a web page, computer terminal, computer display, automated telephone system, telephone operator, or representative employed by the trusted entity 220. Alternatively, the transactional entity can append a transactional entity identifier 242 to the unique code when the transactional entity accesses the trusted entity's computer system.

In another configuration, the person 200 identifies the transactional entity 240 that can use the key. The transactional entity is then linked to the key. In this embodiment, only the transactional entity specified can use and verify the key. The advantage of this embodiment is that a misplaced or stolen key (or unique code) may only be used by the transactional entity specified by the person 200.

The delivered key may be canceled by the person 200 accessing the trusted entity's computer system and cancelling the validity of the key. Cancelling a key after the key has been issued or delivered has the advantage of allowing the person to protect their personal identity information if a key is lost, misplaced, or stolen.

The unique code 244 can be verified by the trusted entity's system by comparing the delivered unique code with the unique code 228 stored in the secure repository 224. If the unique code is valid, the trusted entity can authenticate the person's identity; otherwise the person's identity may not be authenticated (rejected). A person's identity authentication or rejection 238 may be delivered to the transaction entity. The person's identity authentication or rejection 238 may be delivered using a computer network, telephone network, mail, email, mechanical delivery systems, physical delivery systems, human delivery systems, or mechanism used to deliver the unique code. Furthermore, law enforcement authorities may be notified if person's identity authentication is rejected due to an invalid key or invalid unique code.

In another embodiment a photograph of the person 200 may be stored with the person's personal identity information 226 and may be delivered with the identity authentication or rejection. The photograph can provide a secondary verification of the person's identity if the transaction entity has visual or face-to-face contact with the person. The transactional entity may be able to compare the photograph with the person in the transaction.

The transaction 250 between the transactional entity 240 and person 200 can either continue to progress or be executed once the person's identity has been authenticated. The transaction may establish a relationship or account between the person and the transactional entity. Using the trusted entity to verify the person's identity, the transactional entity can be confident the person in the transaction is the true owner of the identity used in the transaction. The transactional entity can reduce their losses due to identity theft if the people they transact business with are consistently the true owners of the identity information used in the transactions.

The transaction entity 200 may receive the person's SSN, birthday, other personal identity information, or combination thereof directly from the trusted entity 220. This information may be provided after the transactional entity provides a valid unique code 244 and the trusted entity authenticates the person's identity to the trusted entity. The person 200, transactional entity, trusted entity, or combination thereof may determine which of the person's personal identity information 226 may be delivered directly from the trusted entity's secure repository 224 to the transactional entity.

Transferring all or a portion of the person's personal identity information 226 directly from the trusted entity 220 to the transactional entity 240 can have the advantage of reducing the number of times a person's personal identity information is delivered, handled, or viewed by humans. The delivery mechanism and security between the trusted entity and transactional entity may be more secure than the delivery mechanism and security between the person 200 and the transactional entity, because the trusted entity is in the business of handling confidential information.

Another advantage to having the trusted entity 220 deliver all or a portion of the person's personal identity information 226 directly to the transactional entity 240 is that the time and expense of filling out personal profile forms for either the person 200 or by the transactional entity can be reduced. The process of entering the person's personal identity information on a transactional entity's form can be automated between the transactional entity and the trusted entity.

Having the trusted entity deliver all or a portion of the person's personal identity information directly to the transactional entity 240 may provide a secondary mechanism for authenticating a person's identity. The transactional entity may be able to compare the person's personal identity information provided by the person 200 with the person's personal identity information 226 provided by the trusted entity 220.

The trusted entity 220 may record, log, or store access information of the person's account or the transaction entity's account on a server. The information can comprise the date, time, information accessed, keys generated, keys validated, computer ID of the computer accessing the account, or other information related to accessing the account. The trusted entity may display the recorded, logged, or stored access information so the person can verify no one else is accessing their account. Displaying logged information for the person's account can be analogized to the person checking their credit report periodically for new accounts or inquiries made by an identity thief on the person's credit report.

A portion or all of the person's personal identity information 226 may not be accessible or viewable to the person 200 after the information is stored in the secure repository. Having the person's personal identity information inaccessible or not viewable can protect the person's authenticated information from being viewed by an impersonator or identity thief, if the user identifier 202 or password 204 was stolen or misused. For example, an identity thief who knows the user's identifier or password could access the person's account and obtain the rest of the person's personal identity information (e.g. SSN or birthday). The additional information may help the impersonator to get more information about the person. As a result the impersonator may get more keys or further engage in stealing the person's identity. Hiding sensitive information may prevent the impersonator from obtaining additional personal identity information. Alternatively, the person's personal identity information may be viewed, accessed, or changed only after the person correctly identified the information already stored on an item by item basis.

Figure 3:
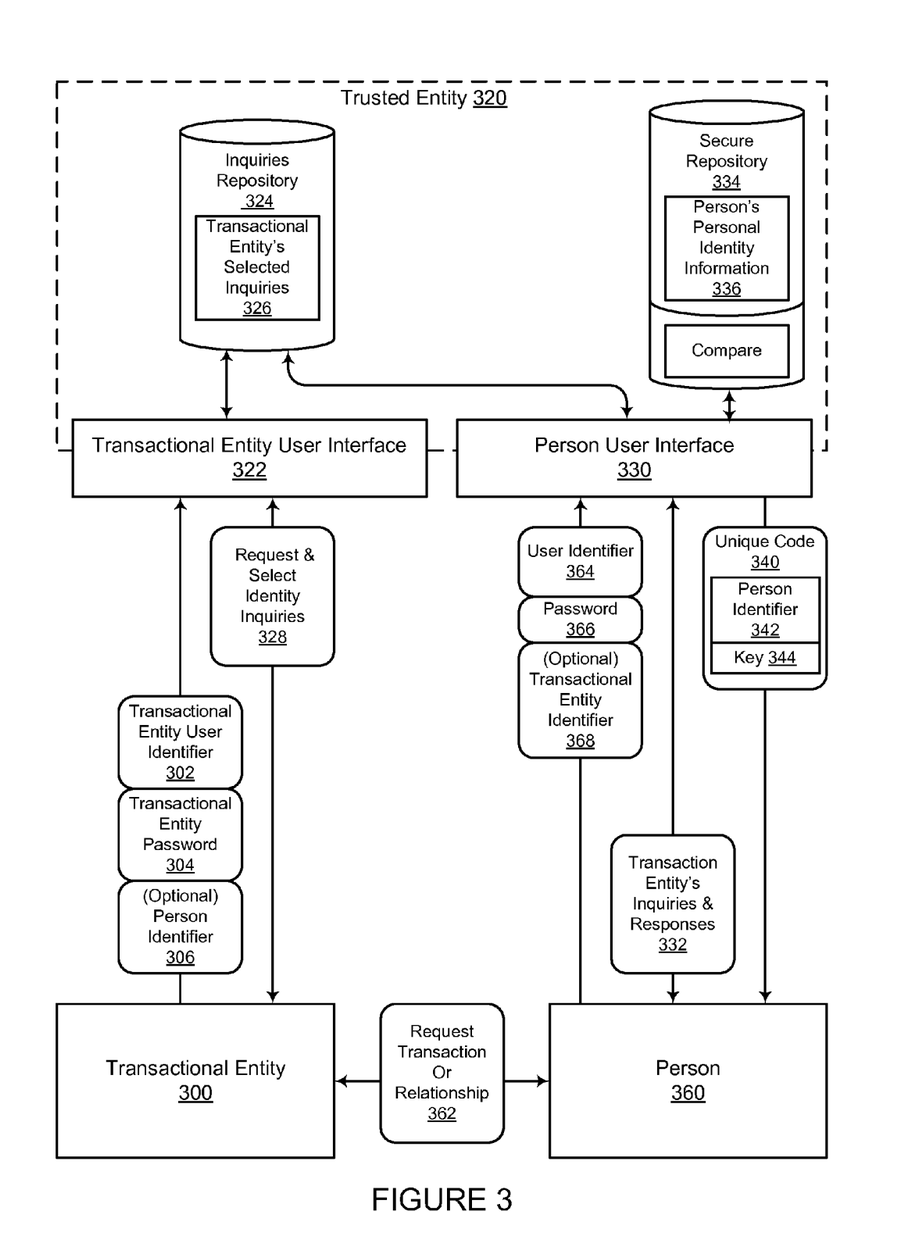
FIG. 3 is an illustration of an embodiment of a method a person uses to obtain a key from a trusted entity by responding to inquiries selected by a transactional entity.

Another embodiment for protecting an individual's identity from identity theft is shown in FIG. 3. Either a transactional entity 300 or a person 360 or may initiate a transaction or relationship 362 between the two parties. The transactional entity can access the transactional entity's account on a trusted entity's system using a transactional entity user identifier 302 and transactional entity password 304. The transactional entity can access the transactional entity's account with a trusted entity 320 either prior to initiating a transaction with the person or after the transaction has been initiated. The transactional entity may use a person identifier 306 if the person is disclosed to the transactional entity prior to the transactional entity accessing the transactional entity's account.

The transactional entity 360 can access the trusted entity's system using a transactional entity user interface 322. The transactional entity user interface can be the same or different from the person user interface 330 used by the person. The transactional entity 300, the trusted entity 320, and the person 360 are similar to the transactional entity 240, the trusted entity 220, and the person 200 described in FIG. 2.

The trusted entity's system 320 can send a request for identity inquiries 328 to the transactional entity 300 after the transactional entity accesses the trusted entity's system. The request for identity inquiries can allow the transactional entity to select questions for the person 360 about the person's identity from a person's personal identity information 336 previously stored in the trusted entity's secure repository 334. The transactional entity may only select the questions or inquiries; but they may not be given the person's responses or the person's personal identity information stored in the secure repository.

The transaction entity 300 or trusted entity 320 may select individual questions, or a plurality of questions placed in a question group. The trusted entity may create various question groups that can provide transactional entities with a certain level of confidence or high level of veracity about the person's identity in a predetermined type of transaction. For example, the person 360 may be required to answer more questions to authenticate their identity if the transaction is for securing a mortgage for a home versus securing credit to buy a television. The transactional entity may require more confidence or higher levels of veracity of the person's identity if the magnitude or cost of the transaction is large than if the magnitude of the transaction is small. The questions in question groups can vary depending on the transaction type which can include whether the transaction is prone to a prior history of identity theft, or the cost to the parties when identity theft occurs in that type of transaction. The transactional entity can also create and save a multiplicity of questions in a question group based on their desires, their transaction types, or types of persons in the transaction.

In another embodiment the questions or inquiries can be randomly selected from a multiplicity of questions. Random inquiries may reduce the number of questions needed to authenticate the person identity and can make predicting and answering the random inquiries difficult for an identity thief.

The additional inquiries or questions for the person 360 may require the person to prove their identity every time the person requests a key 344 from the trusted entity. Even if the person's user identifier 364 and password 366 was stolen or misused by an impersonator or identity thief, the impersonator may still need to provide correct responses to be granted a key. Having the person answer inquiries in addition to the user identifier and password may provide greater protection against identity theft if the user identifier and password are stolen or misused. The transactional entity's identity inquiries selection 326 can be stored on an inquiries repository 324.

As shown in FIG. 3, the person 360 accesses the trusted entity's system using a user identifier 364 and password 366. The person can access the trusted entity's computer system using a person user interface 330. The person user interface can interact with both the inquiries repository 324 and secure repository 334. The person can provide a transactional entity identifier 368 or the trusted entity can list transactional entities desiring identity authentication from the person.

The trusted entity's system 320 can provide the person 360 with the transactional entity's selected inquiries 326 from the inquiries repository 324 after the person accesses the trusted entity's system and the transactional entity has been selected. The person can then respond to the inquiries or questions 332. All the inquiries can be given at once or the inquiries can be given one inquiry at a time where additional inquiries may only be given when the person provides the correct response to the current inquiry. The inquiries can be answering a question, such as, "What is your SSN?" or providing information, such as a fingerprint or sliding a card with a magnetic strip through a card swiper or card reader.

In this embodiment, the person 360 may be granted a key 344 associated with a person identifier 342, combined to form a unique code 340, when the person provides correct responses to all the inquiries. The person can then deliver the unique code to the transactional entity 300 (or 240 as shown in FIG. 2) to complete the transaction.

Figure 4:
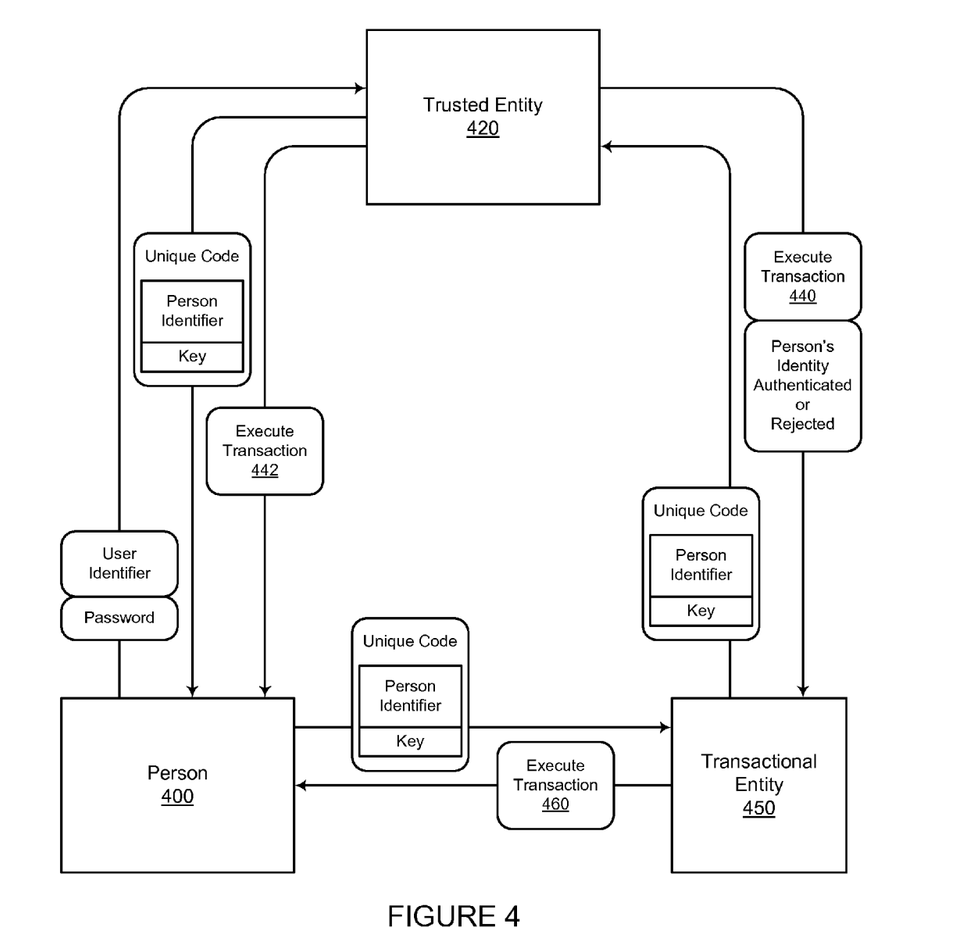
FIG. 4 is an illustration of an embodiment of a method a person uses to obtain a key from a trusted entity, a transactional entity's authentication of the key, and executed transactions that can result from authentication of the key.

Another embodiment for protecting an individual's identity from identity theft is shown in FIG. 4. FIG. 4 is similar to the transaction in FIG. 2, but the executed transaction 460 is not limited to a person 400 and a transactional entity 450. A transaction 442 can occur between the trusted entity 420 and the person. In addition, a transaction 440 can occur between the trusted entity and transactional entity, or any combination of transactions 440, 442, or 460 can occur. For example, an insurance company can be the trusted entity. The transaction can be buying a car. The transactional entity can be an auto dealer with a financing department. When the person's identity is authenticated by the insurance company, the person can buy the car (executed transaction 460) and the insurance company can insure the car (executed transaction 442). In another example the trusted entity can be an insurance company. The insurance company can provide identity insurance to the transactional entity so transactions 440 and 460 are executed.

Figure 5:
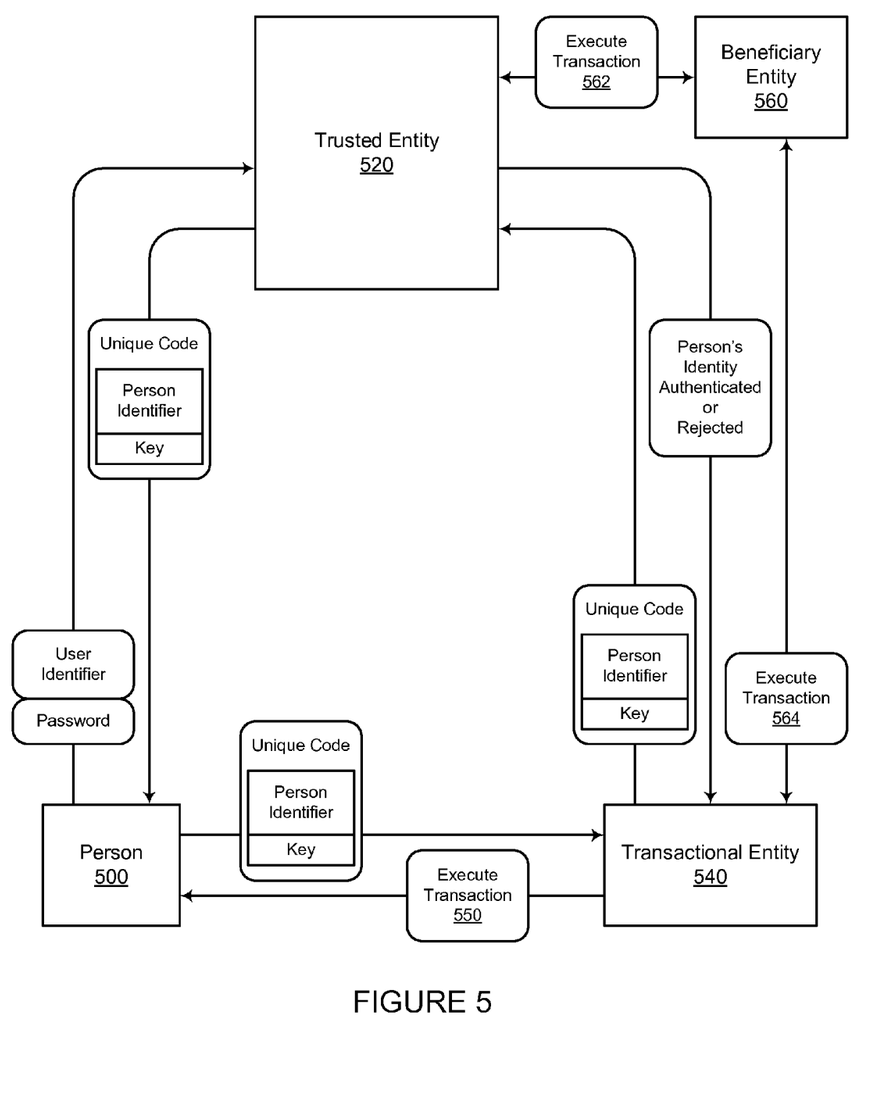
FIG. 5 is an illustration of an embodiment of a method a person uses to obtain a key from a trusted entity, a transactional entity's authentication of the key, and executed transactions with a beneficiary entity that can result from authentication of the key.

Another embodiment for protecting an individual's identity from identity theft is shown in FIG. 5. FIG. 5 has similarities the transaction in FIG. 2, but the executed transaction 550 is not limited to the transaction between a person 500 and a transactional entity 540. A transaction 562 can occur between the trusted entity 520 and a beneficiary entity 560. In addition, a transaction 564 can occur between transactional entity and beneficiary entity, or any combination of transactions 550, 562, or 564 can occur.

The beneficiary entity can be any entity, similar to the transactional entity, but not requesting the person to provide proof of identity. For example, a first health care facility can be the transactional entity. The transaction can be transferring the person's medical records. The beneficiary entity can be a second health care facility. When the person's identity is authenticated by the trusted entity the medical records get transferred from the first health care facility to a second health (executed transaction 564). The beneficiary entity can comprise the same organizations or individuals comprising the trusted entity or transactional entity.

In another example, an insurance company can be the trusted entity and provide identity theft insurance to either the person or the transactional entity. The person may get insurance when they agree to follow protocols and procedures established by the insurance company to protect the person's personal identity information. These protocols and procedures can include using a unique code when establishing a relationship or a transaction with a new transactional entity desiring the person's personal identity information. Following these protocols and procedures may prevent the person from divulging their personal identity information, which may protect that information from current and future identity theft incidents. The insurance company may also provide the service of monitoring the person's credit report for new accounts and inquiries on the report and other services to protect the person's identity from their personal identity information they already divulged in the past. The person may register their new accounts or transactions with the insurance company so the insurance would not be alerted by accounts or transactions showing up on the credit report. New accounts by an identity thief would alert the insurance company. The insurance company may also pay the cost to protect or clean-up the person credit report, represent the person, or litigate for the person on identity theft cases and incidents.

The insurance company may also provide identity insurance to the transactional entity. The transactional entity may obtain insurance when they agree to follow protocols and procedures established by the insurance company to protect the transactional entity against identity theft in transactions with persons. The insurance company may pay for identity theft claims, which may otherwise be paid by the transactional entity, if the transactional entity used the insurance company's (the trusted entity's) system, protocols, or procedures in the transaction and identity theft still occurred in the transaction.

In another embodiment, the trusted entity of either FIG. 2 or FIG. 3 can initially authenticate or assess the transactional entity's identity information. The transactional entity's identity information can be the transactional entity's identity, information security systems, financial viability, customer satisfaction rating, or other information important to the person in deciding whether to transact with the transactional entity. In other words, the identity of a company is validated using this method. Each item in the transactional entity's identity information can be given a separate rating by the trusted entity, or place in a category selected from a predetermined plurality of categories called category groups. Based on the transactional entity's identity information, the transactional entity can be given an overall rating by the trusted entity, or be placed in an overall category used to categorize transactional entities. The categories or ratings can be ordered by desirability where the most desirable category or ratings can have the highest category or rating, and the least desirable category or ratings can have the lowest category or rating. The trusted entity may display the rating or categorization to the person considering a transaction with the transactional entity. The person may choose to transact only with transactional entities meeting a minimal rating or category.

In one embodiment the trusted entity may notify the person if a transactional entity does not meet the person's minimum category or rating. In another configuration, the person's personal identity information may not be validated or authenticated for the transactional entity not meeting the person's minimum category or rating. The result of authenticating a transactional entity's identity information, rating that information, or categorizing that information is that the person's personal identity information can be protected by allowing the person to select to transact with transactional entities that will protect their personal identity information.

Figure 6:
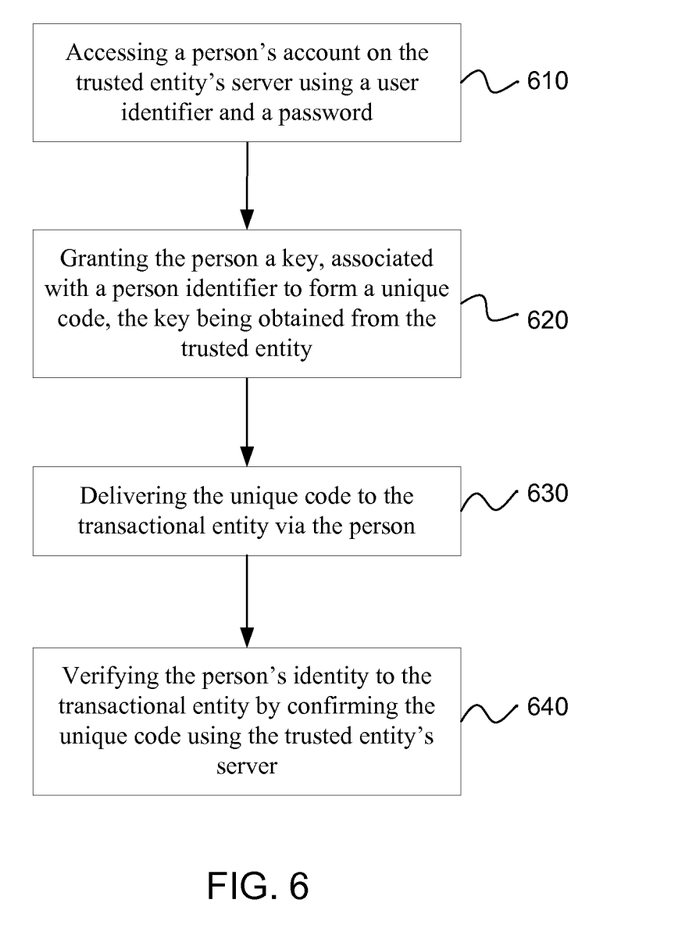
FIG. 6 is a flow chart of an embodiment of a method for a person using a unique code from a trusted entity to authenticate the person's identity with a transactional entity.

In another embodiment, a method for authenticating a person's identity to a transactional entity using a trusted entity with a secure repository of a person's identity information is shown in FIG. 6. The person can access a person's account on the trusted entity's server using a user name and a password 610. Then, the trusted entity can grant a key, associated with a person identifier to form a unique code 620. Next, the person can deliver the unique code to the transactional entity 630. Then, the transactional entity can verify the person's identity by confirming the unique code using the trusted entity's server 640.

In an example, the Social Security Administration (SSA) can be the trusted entity and a bank can be the transactional entity. The transaction can be obtaining a loan. The user identifier and the person identifier can be a person's Social Security Number (SSN). The key can be a traditional personal identification number (PIN). The SSA can grant a PIN for a person's use in transactions using a SSN. The person can provide the SSN (person identifier) with its PIN (key) to the bank. The bank can verify the SSN and its associated PIN with the SSA. Without a valid PIN the bank may not be able to validate the SSN, so the person cannot secure the loan. The PIN may be changed when a person feels the PIN has been comprised or at regular intervals. The PIN may be used at the bank or other transactional entities desiring a SSN for personal identification. Associating or pairing a PIN to a SSN can transform the static and permanent nature of a SSN into a personal identifier that can be changed and protected.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method for authenticating a person's identity to a transactional entity using a trusted entity with a secure repository of a person's personal identity information, comprising:

receiving personal identity information at a trusted entity computer system, the personal identity information being confidentially stored by the trusted entity computer system;

in the secure repository, storing a user identifier and a password that are associated with, but do not contain, the personal identity information;

at the trusted entity computer system, receiving a request from the person for a unique code, the request including the user identifier and the password, the person's identity having been previously authenticated by the trusted entity computer system;

providing the unique code to the person, the unique code comprising a person identifier and a key, wherein the unique code is thereafter transmitted to a transactional entity to identify the person without providing the personal identity information to the transactional entity; and the trusted entity computer system confirming the unique code to the transactional entity to verify the person's identity.

2. A method for authenticating a person's identity to a transactional entity using a trusted entity with a secure repository of a person's personal identity information, comprising:

receiving personal identity information at a trusted entity computer system, the personal identity information being confidentially stored by the trusted entity computer system;

in the secure repository, storing a user identifier and a password that are associated with, but do not contain, the personal identity information;

at the trusted entity computer system, receiving a request from the person for a single-use key, the request including the user identifier and the password, wherein the single-use key is associated with a person identifier to form a unique code, the person's identity having been previously authenticated by the trusted entity computer system;

providing the unique code to the person, wherein the unique code is thereafter transmitted to a transactional entity to identify the person without providing the personal identity information to the transactional entity; and the trusted entity computer system confirming the unique code to the transactional entity to verify the person's identity; and displaying a photograph of the person stored with the person's personal identity information in the trusted entity's secure repository to the transactional entity after the person's identity has been verified using the unique code.

3. The method as in claim 2, wherein the single-use key expires after a predetermined time period.

4. The method as in claim 1, wherein the user identifier is a unique user name created by the trusted entity computer system.

5. The method as in claim 1, wherein the person identifier is a unique identifying name created by the trusted entity computer system and does not contain any personal identity information.

6. The method as in claim 1, further comprising the steps of recording and storing information on accesses to the person's account on the trusted entity computer system, which can be displayed to the person.

7. The method as in claim 1, further comprising of recording and storing the information on granting or denying the single-use key on the trusted entity computer system, which can be displayed to the person.

8. The method as in claim 1, wherein providing the unique code to the person requires receiving correct responses to predetermined inquiries on the person's personal identity information stored in the secure repository.

9. The method as in claim 2, wherein providing the unique code to the person requires receiving correct responses to predetermined inquiries on the person's personal identity information stored in the secure repository.

10. The method as in claim 1, further comprising:
authenticating the person's identity initially by the trusted entity computer system using trusted data and other trusted entities.

11. The method as in claim 2, wherein the person's personal identity information is selected from the group consisting of: a person's name, social security number, birthday, address, employment information, financial information, biographical information, biometric data, personal information only known by the person, secrets only known by the person, and a combination thereof.

12. The method as in claim 11, wherein the biometric data is selected from the group consisting of: handwriting, signature, fingerprints, voiceprints, retinal scans, iris scans, DNA or blood sample, facial recognition, hand geometry, vascular patterns, dental records, and a combination thereof.

13. The method as in claim 1, wherein the transactional entity computer system verifies the person's unique code using a transactional user interface.

14. The method as in claim 2, wherein the transactional entity is selected from the group consisting of: a bank, a financial institution, a business, an insurance company, a health care facility, a government entity, and another entity desiring the person's identity to be authentic.

15. The method as in claim 1, wherein the transactional entity computer system verifies the person's unique code by using an account of the transactional entity at the trusted entity computer system.

16. The method as in claim 2, wherein receiving personal identity information, receiving the request, providing the unique code to the person, and confirming the unique code use a computer network, automated telephone network, telephone network with a human operator accessing the person's account on trusted entity's server for the person and granting the unique code, physical delivery mechanism, or combination thereof.

17. The method as in claim 1, further comprising specifying the transactional entity for which the unique code will be generated, wherein the unique code authenticates the person's identity only when the transactional entity specified by the person verifies the unique code.

18. The method as in claim 2, wherein a portion or all of the person's personal identity information is not accessible or viewable to the person after the information is stored in the secure repository, whereby that portion of the person's personal identity information cannot be viewed or accessed by an identity thief if the identity thief obtains the person's user identifier and password.

19. The method as in claim 2, further comprising printing the unique code on a certificate after granting the unique code.

20. A method for generating a single-use key used for authenticating a person's identity using a trusted entity with a secure repository of a person's personal identity information comprising:

receiving personal identity information at a trusted entity computer system, the personal identity information being confidentially stored by the trusted entity computer system;

storing a user identifier and a password that are associated with, but do not contain, the personal identity information;

receiving the person's responses to inquiries, the inquiries having been selected by a verifying entity to authenticate the person's identity;

accessing an account of the person on the trusted entity computer system using the user identifier and the password:

comparing the person's responses to the inquiries with the person's stored personal identity information; and generating a single-use key associated with a person identifier to form a unique code to allow a transaction to be executed, if the person's responses match the person's stored personal identity information stored, the person's identity having been previously authenticated by the trusted entity computer system.

21. The method as in claim 20, further comprising specifying the transactional entity for which the unique code will be generated after accessing the account of the person.

22. The method as in claim 20, wherein the inquiries are randomly generated.

23. The method as in claim 20, wherein the verifying entity comprises the transactional entity or the trusted entity.

24. A system for authenticating a person's identity to a transactional entity using a trusted entity, comprising:

a trusted entity which receives personal identity information from a person, the personal identity information being confidentially stored by the trusted entity;

a user identifier associated with but not containing any of the personal identity information;

a password associated with but not containing any of the personal identity information;

a client module with a person input device for a person to enter the user identifier and the password, a person processing unit connected to the person input device to prompt the person for the user identifier and the password, and a person display unit connected to the person processing unit to display a the key associated with a person identifier to form a unique code to the person, the person's identity having been previously authenticated by the trusted entity;

a transactional processing module with an transactional input device for the transactional entity to enter the key, a transactional processing unit connected to the transactional input device to prompt the transactional entity for the key, and a transactional display unit connected to the transactional processing unit to display a message to the transactional entity authenticating the person's identity and to display a photograph of the person, whereby the photograph is a secondary verification to the unique code; and a trusted entity server with a trusted entity processing unit to process requests from the client module and the transactional processing module using a network, and a database accessible to the trusted entity processing unit to store the user identifier, the password, the unique code, and the person's personal identity information, including the photograph.

* * * * *